United States Patent
Matsushita et al.

(10) Patent No.: US 9,260,003 B2
(45) Date of Patent: Feb. 16, 2016

(54) CONTROL DEVICE AND CONTROL METHOD FOR ELECTRIC VEHICLE

(75) Inventors: Masanori Matsushita, Saitama (JP); Naoki Fujishiro, Saitama (JP); Osamu Saito, Saitama (JP); Hidetoshi Kobori, Saitama (JP); Satoshi Matsushita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/642,100

(22) PCT Filed: Apr. 26, 2011

(86) PCT No.: PCT/JP2011/060139
§ 371 (c)(1),
(2), (4) Date: Oct. 18, 2012

(87) PCT Pub. No.: WO2011/145441
PCT Pub. Date: Nov. 24, 2011

(65) Prior Publication Data
US 2013/0060409 A1 Mar. 7, 2013

(30) Foreign Application Priority Data
May 17, 2010 (JP) ................................. 2010-112955

(51) Int. Cl.
*B60W 10/08* (2006.01)
*B60W 10/192* (2012.01)
(Continued)

(52) U.S. Cl.
CPC . *B60K 6/442* (2013.01); *B60L 7/18* (2013.01); *B60L 15/2081* (2013.01);
(Continued)

(58) Field of Classification Search
None
See application file for complete search history.

(56) References Cited

U.S. PATENT DOCUMENTS

| 5,176,234 A | * | 1/1993 | Reik | ...................... B60W 10/06 192/53.2 |
| 5,785,138 A | * | 7/1998 | Yoshida | ................... B60K 6/46 180/65.245 |

(Continued)

FOREIGN PATENT DOCUMENTS

| EP | 1215071 B1 * | 9/2005 |
| EP | 2428771 A1 * | 3/2012 |

(Continued)

OTHER PUBLICATIONS

Decision of Grant dated Jun. 24, 2014, issued in Corresponding Russian Patent Application No. 2012154336, with English Translation (18 pages).

*Primary Examiner* — John R Olszewski
*Assistant Examiner* — Jean-Paul Cass
(74) *Attorney, Agent, or Firm* — Westerman, Hattori, Daniels & Adrian, LLP

(57) ABSTRACT

If the temperature (Tig) of a switching element (25) in a source power supply circuit (24) of an electric motor (2) increases to be equal to or greater than a first predetermined value (α) while an electric vehicle (1) is in a stall state, a torque command for the electric motor (2) is reduced while a braking force command for a brake unit (10) is increased, and if the temperature (Tig) of the switching element (25) subsequently decreases to be equal to or less than a second predetermined value (β(<α)), the braking force command for the brake unit (10) is decreased while the torque command for the electric motor (2) is increased. The increment rate of the torque command for the electric motor (2) is varied in accordance with the degree of road gradient.

7 Claims, 8 Drawing Sheets

(51) Int. Cl.
*B60W 20/00* (2006.01)
*B60K 6/442* (2007.10)
*B60L 7/18* (2006.01)
*B60T 13/74* (2006.01)
*B60W 10/184* (2012.01)
*B60W 30/18* (2012.01)
*B60T 17/22* (2006.01)
*B60L 15/20* (2006.01)

(52) U.S. Cl.
CPC ............ *B60T 13/745* (2013.01); *B60T 17/221* (2013.01); *B60W 10/08* (2013.01); *B60W 10/184* (2013.01); *B60W 30/18109* (2013.01); *B60L 2240/423* (2013.01); *B60L 2240/525* (2013.01); *B60W 20/00* (2013.01); *B60W 2510/087* (2013.01); *Y02T 10/6234* (2013.01); *Y02T 10/642* (2013.01); *Y02T 10/7275* (2013.01)

(56) References Cited

U.S. PATENT DOCUMENTS

| | | | | |
|---|---|---|---|---|
| 6,076,032 A * | 6/2000 | Kuroda | ................ | F02D 11/105 477/97 |
| 7,443,116 B2 * | 10/2008 | Kutsuna | ............. | B60L 11/1803 180/65.1 |
| 7,622,879 B2 * | 11/2009 | Hirasawa | ............. | H02P 29/028 180/65.285 |
| 7,876,061 B2 * | 1/2011 | Wright | ................... | H02J 3/008 290/40 B |
| 7,928,686 B2 * | 4/2011 | Saha | ....................... | H02P 6/183 180/65.285 |
| 7,952,306 B2 * | 5/2011 | Wright | ................... | B60L 11/02 318/108 |
| 8,040,091 B2 * | 10/2011 | Gears | .................... | H02P 29/021 180/6.5 |
| 8,076,874 B2 * | 12/2011 | Ueno | ...................... | B60L 7/14 318/139 |
| 8,165,737 B2 * | 4/2012 | Schulz | .................. | B60K 6/445 318/432 |
| 8,217,602 B2 * | 7/2012 | Ikei | ........................ | H02P 6/182 318/400.13 |
| 8,242,735 B2 * | 8/2012 | Hein | ................... | H02P 29/0088 318/798 |
| 8,307,927 B2 * | 11/2012 | Taguchi | ............. | H02P 29/0088 180/65.285 |
| 8,384,328 B2 * | 2/2013 | Fuller | .................... | F02N 11/087 123/179.1 |
| 8,556,011 B2 * | 10/2013 | Anwar | .................... | B60L 3/12 180/65.275 |
| 8,581,556 B2 * | 11/2013 | Shibata | ............... | H01M 10/425 320/134 |
| 2007/0114965 A1 * | 5/2007 | Kutsuna | .............. | B60L 11/1803 318/807 |
| 2008/0141921 A1 * | 6/2008 | Hinderks | .................. | B63B 1/28 114/274 |
| 2009/0120701 A1 * | 5/2009 | Taguchi | ............. | H02P 29/0088 180/65.285 |
| 2010/0174429 A1 * | 7/2010 | Hase | ....................... | B60K 6/48 701/22 |
| 2010/0275890 A1 * | 11/2010 | Mcdonald-Walker | ... | B60K 6/24 123/564 |
| 2012/0046841 A1 * | 2/2012 | Wurthner | .............. | B60W 10/02 701/54 |
| 2012/0227389 A1 * | 9/2012 | Hinderks | .................. | F01B 1/10 60/317 |
| 2013/0060409 A1 * | 3/2013 | Matsushita | ............ | B60K 6/442 701/22 |
| 2014/0285331 A1 * | 9/2014 | Otake | ...................... | G08G 1/16 340/435 |
| 2014/0303823 A1 * | 10/2014 | Nakanishi | ................ | B60K 6/48 701/22 |
| 2014/0309882 A1 * | 10/2014 | Antchak | ................ | F02B 67/06 701/36 |

FOREIGN PATENT DOCUMENTS

| | | | | |
|---|---|---|---|---|
| EP | 002428771 A1 * | 3/2014 | ............ | B60K 31/04 |
| JP | 07-336807 A | 12/1995 | | |
| JP | 11-113108 A | 4/1999 | | |
| JP | 2008-301547 A | 12/2008 | | |
| JP | 2009-023378 A | 2/2009 | | |
| JP | 2009-232485 A | 10/2009 | | |
| RU | 2372227 C2 | 11/2009 | | |

\* cited by examiner

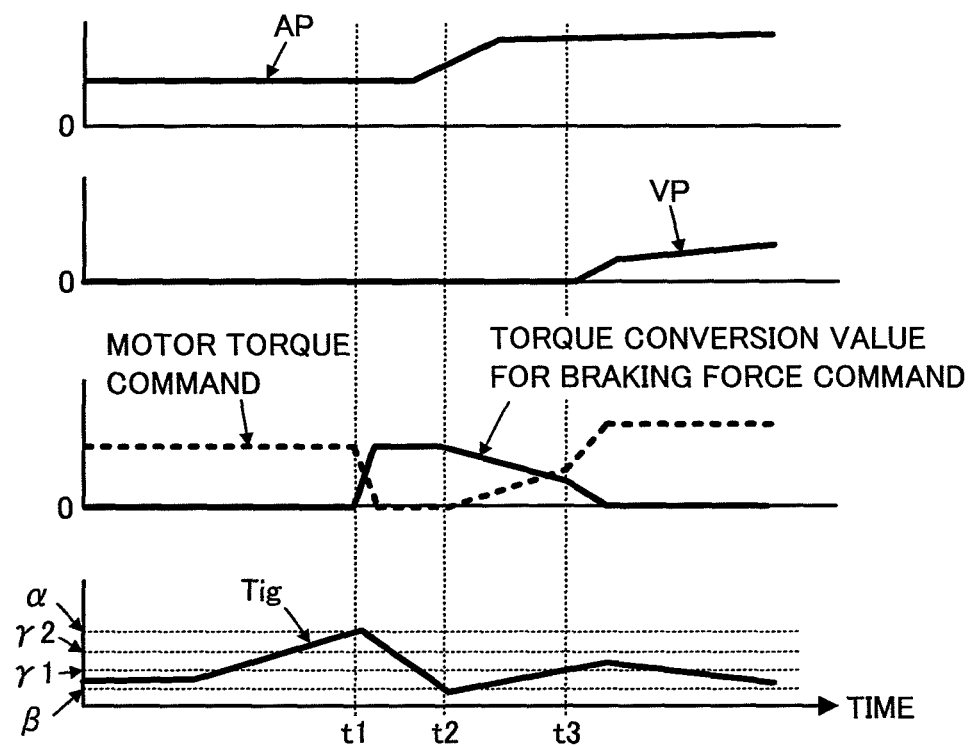

CONTROL DEVICE AND CONTROL METHOD FOR ELECTRIC VEHICLE

CROSS-REFERENCE TO RELATED APPLICATION

This application is a National Stage entry of International Application No. PCT/JP2011/060139 filed Apr. 26, 2011, which claims priority to Japanese Patent Application No. 2010-112955 filed May 17, 2010, the disclosure of the prior applications are hereby incorporated in their entirety by reference.

TECHNICAL FIELD

The present invention relates to a control device and a control method for an electric vehicle provided with an electric motor which serves as a generation source of a driving force of the vehicle.

BACKGROUND ART

In an electric vehicle provided with an electric motor such as a synchronous motor or the like serving as a generation source of a driving force of the vehicle, a driving torque output from the electric motor is transmitted to driving wheels of the vehicle via a power transmission mechanism such as a transmission or the like to generate the driving force for the vehicle.

When the electric vehicle of this type is on an ascending slope or the like, it is possible that an operation state of the vehicle is in a so-called stall state. The stall state refers to such a state that even though the driving torque generated in the electric motor according to manipulations of an accelerator or the like of the vehicle is being transmitted to the driving wheels of the vehicle, the vehicle is in a stopped state (a vehicular velocity is maintained at zero or almost at zero).

In the stall state, the electric motor generates the driving torque while a rotor thereof has stopped rotating.

In the electric motor of such electric vehicle, the armature windings thereof are generally connected to a direct current power source via an inverter circuit including a plurality of switching elements. The electric motor generates the driving torque by supplying the electric power to the armature windings from the direct current power source via the inverter circuit. At this moment, the on and off of the switching elements included in the inverter circuit is conducted in conjunction with the rotation of the rotor of the electric motor. Thus, in the above-mentioned stall state where the rotor of the electric motor has stopped rotating, a specific switching element in the inverter circuit is maintained at the ON state, and the current is kept flowing in the switching element. Thereby, it is liable for the switching element to become overheated.

Conventionally, as a vehicle control technique of the electric vehicle in the stall state, there have been known those disclosed in Patent documents 1, 2 and 3, for example.

According to the technique disclosed in Patent document 1, when the operation state of the vehicle falls into the stall state and the stall state has been lasted over an allowable time determined on the basis of a torque being generated by the electric motor, the torque of the electric motor is controlled to decrease so as to make a recession velocity or a recession acceleration of the vehicle equal to or lower than a predetermined value. Thereby, the switching element in the inverter circuit is prevented from becoming overheated.

Patent document 2 has disclosed a technique which makes the electric motor generate a torque so as to maintain the stopped state of the vehicle for a predetermined time after a brake operation (an operation on a brake pedal) is released when the electric vehicle is temporarily stopped in the travelling. According to the technique, after the predetermined time has elapsed until an accelerator operation (an operation on an accelerator pedal) is conducted to start up the vehicle, even though the brake operation is not conducted, a brake driving device is actuated automatically.

Patent document 3 has disclosed a technique which prevents the inverter circuit from becoming overheated by actuating the brake of the vehicle to immobilize the vehicle and meanwhile stops the electric motor from generating a torque if the temperature of the inverter circuit becomes equal to or greater than a predetermined temperature when the vehicle is in the stall state. According to the technique, as the temperature of the inverter circuit drops below the predetermined temperature, the brake is released and meanwhile the electric motor is made to generate a torque equal to or greater than a predetermined value.

CITATION LIST

Patent Documents

Patent document 1: Japanese Patent Laid-open No. 117-336807

Patent document 2: Japanese Patent Laid-open No. H11-113108 (Paragraph 0046 to 0055)

Patent document 3: Japanese Patent Laid-open No. 2009-232485

SUMMARY OF INVENTION

Technical Problem

According to the technique disclosed in Patent document 1, even though a driver maintains the accelerator operation constantly after the start of the stall state, the driving torque of the electric motor is decreased after a predetermined allowable time has elapsed, and thereby the vehicle recedes. At this moment, if the driver responds lately to the recession of the vehicle, the brake operation or the accelerator operation will be late for stopping the recession; thereby, it is possible that the vehicle will contact a succeeding vehicle. Moreover, if the driver steps the accelerator pedal further down so as to stop the vehicle from receding, the current flowing in the switching element of the inverter circuit is increased once again. Thereby, it is disadvantageous that the heat generation of the switching element may not be inhibited sufficiently.

According to the technique disclosed in Patent document 2, after the brake operation is released, the time for making the motor generate the torque so as to maintain the stopped state of the vehicle is limited to the predetermined time, and after the predetermined time has elapsed, the brake driving device is actuated; thereby, it is possible to maintain the stopped state of the vehicle even after the energization is stopped while restricting the energization time of electricity in the inverter circuit in the stall state.

However, after the brake driving device is actuated till the accelerator operation is conducted to start up the vehicle, the vehicle is maintained at the stopped state according to the operation of the brake driving device. Herein, the brake driving device uses the oil pressure to press a brake pad against a brake disc to generate a braking force. Thereby, it is liable to have a response delay occurred in releasing the actual braking force with respect to a release command of the braking force.

Thus, according to the technique disclosed in Patent document 2, in case that the driver of the vehicle has conducted the accelerator operation so as to start up the vehicle, the release of the braking force by the brake driving device may be delayed; thereby, it is likely that the vehicle may not be started smoothly.

According to the technique disclosed in Patent document 3, immediately after the inverter circuit is cooled down by stopping the electric motor from generating the torque, a torque greater than a required torque or a maximum torque is generated from the electric motor, thereby, it is disadvantageous that the vehicle may be started at an excessive velocity, according to a gradient level of a road.

The present invention has been accomplished in view of the aforementioned problems, and it is therefore an object of the present invention to provide a control device and a control method for an electric vehicle capable of automatically maintaining the vehicle at a stopped state while preventing a switching element of a circuit configured to supply an electric power to an electric motor serving as a generation source of a driving force of the vehicle when the vehicle is in a stall state and subsequently starting the vehicle smoothly according to a gradient level of a road.

Solution to Problem

The present invention provides a control device for an electric vehicle provided with an electric motor which serves as a generation source of a driving force of the vehicle, a source power supply circuit which includes a switching element connected to an armature winding of the electric motor and is configured to supply a source power to the electric motor according to an on and off control of the switching element, an electric motor control unit which controls a flowing current in the armature winding of the electric motor according to a torque command serving as a command value of an output torque of the electric motor via the source power supply circuit, a brake unit which generates a mechanical braking force from a brake liquid pressure to brake a wheel of the vehicle, and a brake control unit which controls the braking force generated by the brake unit according to a braking force command serving as a command value of the braking force. The control device for the electric vehicle comprises: a stall determination unit configured to determine whether or not an operation state of the vehicle is in a stall state in which the vehicle is still in a stopped state even though the output torque serving as the driving force of the vehicle has been transmitted from the electric motor to a driving wheel of the vehicle; a switching element temperature acquiring unit configured to acquire a detection data of a temperature of a switching element in the source power supply circuit; an electric motor and brake cooperation control unit configured to generate the torque command to be supplied to the electric motor control unit and the braking force command to be supplied to the brake control unit so as to cooperate the operations of the electric motor and the brake unit; and a road gradient information acquiring unit configured to acquire a gradient information denoting a gradient level of a road on which the vehicle is present. The electric motor and brake cooperation control unit is provided with a unit for executing a first control processing which generates the torque command so as to decrease the output torque of the electric motor and meanwhile generates the braking force command so as to increase the braking force of the brake unit by the amount equivalent to the decreased amount of the output torque of the electric motor when the temperature of the switching element denoted by the detection data acquired by the switching element temperature acquiring unit increases to be equal to or greater than a first predetermined value when the determination result by the stall determination unit is affirmative, and a unit for executing a second control processing which generates the braking force command so as to decrease the braking force of the brake unit and meanwhile generates the torque command so as to increase the output torque of the electric motor by the amount equivalent to the decreased amount of the braking force of the brake unit when the temperature of the switching element denoted by the detection data acquired by the switching element temperature acquiring unit decreases to be equal to or less than a second predetermined value smaller than the first predetermined value after the execution of the first control processing, and the unit for executing the second control processing is configured to generate the torque command so as to vary the increasing rate of the output torque of the electric motor according to the gradient level of the road denoted by the gradient information acquired by the road gradient information acquiring unit (First aspect).

BRIEF DESCRIPTION OF THE DRAWINGS

FIG. 9 is a time chart illustrating another example of the braking force command, the motor torque command and the like varied with time.

DESCRIPTION OF EMBODIMENTS

An embodiment of the present invention will be described with reference to FIG. 1 to FIG. 9.

Figure 1:
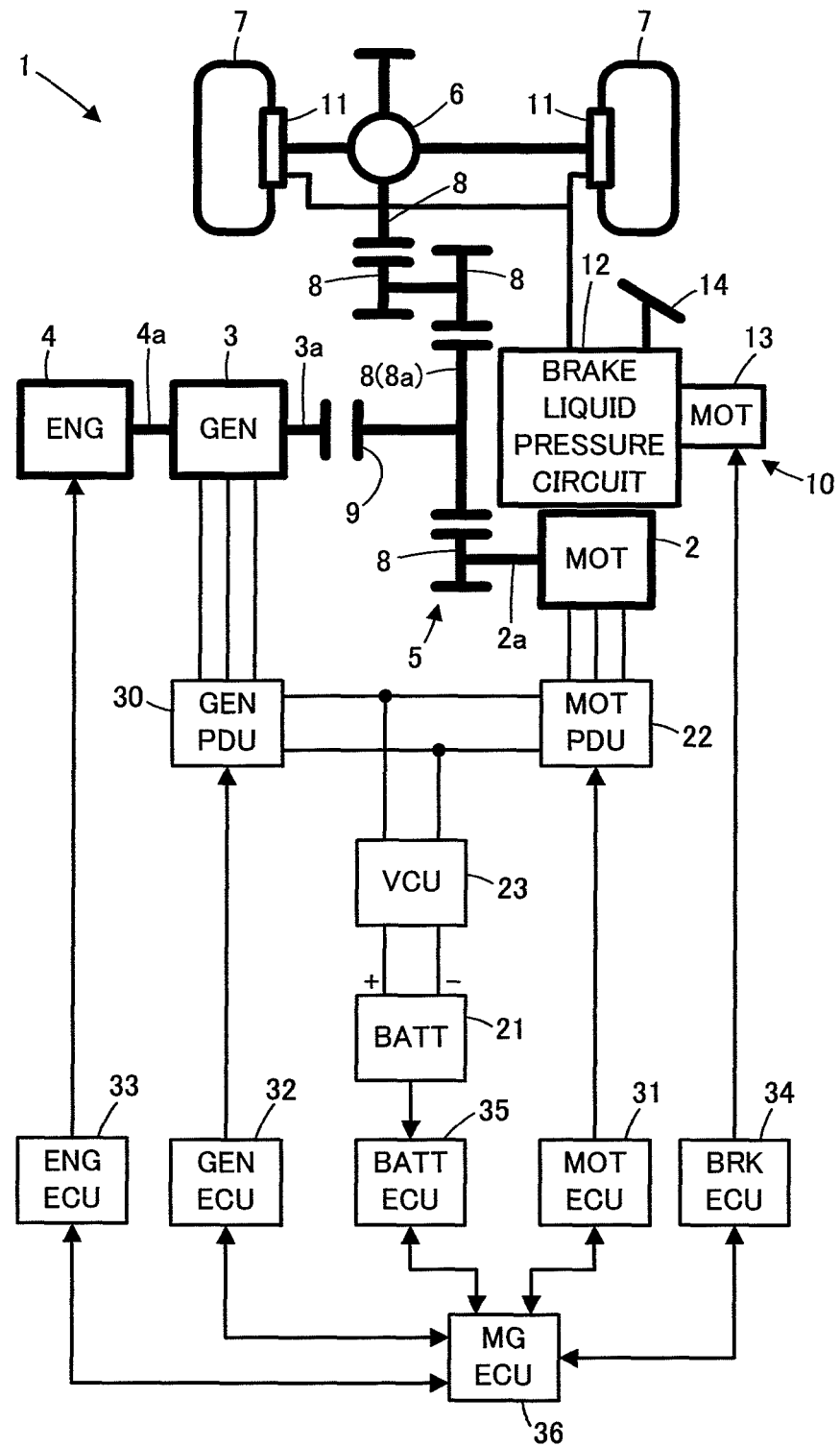
FIG. 1 is a diagram schematically illustrating a system configuration of an electric vehicle according to an embodiment of the present invention.

Firstly, the mechanical configuration of an electric vehicle of the present embodiment will be described. With reference to FIG. 1, the electric vehicle of the present embodiment (may be simply referred to as the vehicle 1 hereinafter) is provided with an electric motor 2 serving as a generation source of a driving force of the vehicle 1, a generator 3 and an engine 4 for driving the generator 3. In the present embodiment, the engine 4 may be used as the generation source of a driving force of the vehicle 1. Therefore, the electric vehicle 1 of the present embodiment may operate as a series hybrid vehicle or a parallel hybrid vehicle.

The electric motor 2 is disposed with a rotary shaft 2a rotating integrally with a rotor (not drawn). The rotary shaft 2a is connected to a pair of wheels (driving wheels) 7, 7 through the intermediary of a power transmission mechanism 5 and a differential gear mechanism 6. The power transmission is conducted between the electric motor 2 and the wheels 7, 7 through the intermediary of the power transmission mechanism 5 and the differential gear mechanism 6. The power transmission mechanism 5 in the example of the present embodiment is comprised of a plurality of gears 8. In addition, it is acceptable for the power transmission mechanism 5 to include therein a transmission such as a CVT or the like.

The generator 3 and the engine 4 are disposed coaxially. A rotary shaft 3a rotating integrally with a rotor (not drawn) of the generator 3 and an output shaft (crank shaft) 4a of the engine 4 are coupled together to rotate integrally. An end portion of the rotary shaft 3a of the generator 3 protruded opposite to the engine 4 is coupled coaxially with one gear 8a of the power transmission mechanism 5 through a clutch mechanism 9. The clutch mechanism 9 is configured to be able to operate selectively at a disconnected state in which the power transmission between the rotary shaft 3a and the gear 8a is disabled and a connected state in which the power transmission is enabled.

Thus, when the clutch mechanism 9 is operating at the connected state, the power of the engine 4 can be transmitted from the output shaft 4a to the wheels 7, 7 through the intermediary of the rotary shaft 3a of the generator 3, the clutch mechanism 9, the power transmission mechanism 5 and the differential gear mechanism 6. Therefore, in this state, it is possible to use the engine 4 alone or in combination with the electric motor 2 as the generation source of the driving force of the vehicle 1. Moreover, in this state, it is possible for the generator 3 to conduct a power-generating operation if necessary.

When the clutch mechanism 9 is operating at the disconnected state, the power transmission from the output shaft 4a of the engine 4 to the rotary shaft 3a of the generator 3 and the driving wheels 7, 7 is disabled. Therefore, in this state, the power of the engine 4 will not be transmitted to the driving wheels 7, 7, and it is possible for the generator 3 to conduct a power-generating operation.

The electric motor 2 can conduct not only a power-running operation which generates a driving torque when the electric power is supplied to the armature windings thereof but also a power-generating operation which outputs the generated electric power. For example, when the vehicle 1 is travelling at a reduced velocity, it is possible for the electric motor 2 to conduct the power-generating operation (regenerative operation) powered by the kinetic energy of the vehicle 1.

Similarly, it is possible for the generator 3 to conduct not only the power-generating operation but also the power-running operation. For example, when the engine 4 is being started, it is possible for the generator 3 to operate as a starting motor which drives the output shaft 4a of the engine 4 to rotate by supplying the electric power to the armature windings of the generator 3.

The electric motor 2 and the generator 3 are configured as for example a 3-phase synchronous apparatus equipped with a permanent magnet in the rotor.

The electric vehicle 1 of the present embodiment is further provided with a brake device (brake unit) 10 which generates a mechanical braking force (braking force resulted from the frictional force) applied to each wheel 7 to brake each wheel 7. The brake device 10 is an electrically-operated brake device comprised of a braking force applying member 11 configured to apply the braking force generated from a brake liquid pressure to each wheel 7, a brake liquid pressure circuit 12 configured to generate the brake liquid pressure supplied to the braking force applying member 11 from a motor cylinder (a cylinder driven by an electric motor) not shown in the drawings, and an electric motor 13 (hereinafter, referred to as the brake motor 13) configured to drive the motor cylinder. In FIG. 1, the wheels 7, 7 disposed with the braking force applying member 11 are a pair of driving wheels; the braking force applying member 11 is also disposed at the other wheels (not drawn).

It is acceptable that the detailed configurations of the braking force applying member 11 and the brake liquid pressure circuit 12 are publicly known. Therefore, though the detailed description and the graphical illustration thereof are omitted in the present specification, the braking force applying member 11, for example, is configured to press a brake pad against a brake disc rotating integrally with each wheel 7 according to the brake liquid pressure to generate the frictional force between the brake disc and the brake pad which serves as the braking force of the wheel 7.

The brake liquid pressure circuit 12 may adopt the one proposed by the applicants of the present invention in, for example, Japanese Patent Laid-open No. 2005-343366 and the like. Therefore, the brake liquid pressure circuit 12 is configured to generate the brake liquid pressure supplied to the braking force applying member 11 of each wheel 7 according to either a master cylinder operating in conjunction with the operation of a brake pedal 14 of the vehicle 1 or the motor cylinder driving by the brake motor 13 without the necessity of operating the brake pedal 14.

The above description explains the major mechanical configuration of the electric vehicle 1 of the present embodiment.

Next, the electrical configuration of the electric vehicle 1 will be described.

The electric vehicle 1 is mounted with a battery (secondary battery) 21 for storing source power to be supplied to the electric motor 2 and the like. The armature windings of the electric motor 2 are electrically connected to the battery 21 through the intermediary of a power drive unit 22 (hereinafter, referred to as the motor PDU 22) which is a motor driving circuit containing an inverter circuit 24 to be described later and a voltage regulator 23 (hereinafter, referred to as the VCU 23) comprised of a DC/DC converter and the like. Thereby, it is possible to transfer the electric power between the electric motor 2 and the battery 21 through the motor PDU 22.

Figure 2:
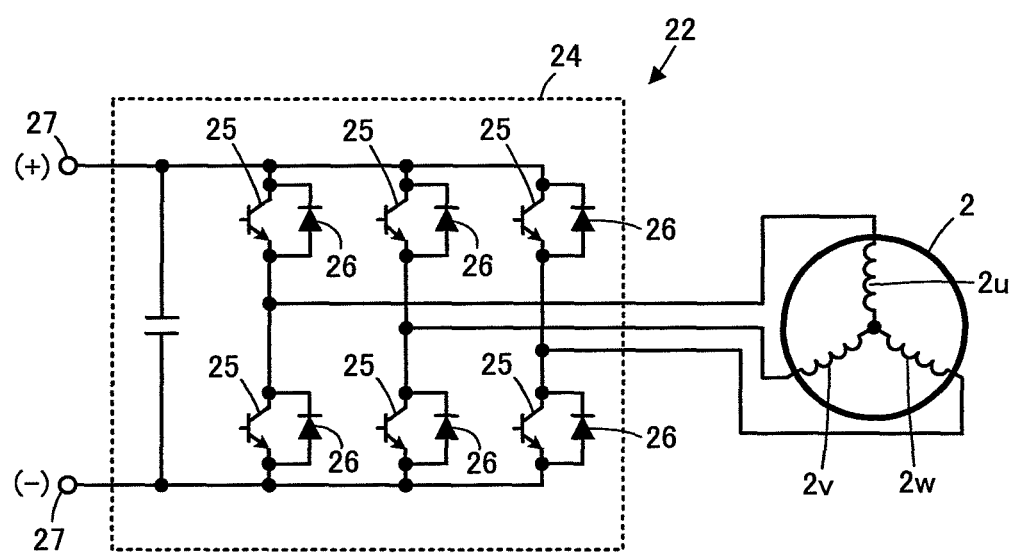
FIG. 2 is a diagram illustrating a circuit configuration of a main part of a motor PDU 22 illustrated in FIG. 1.
Figure 3:
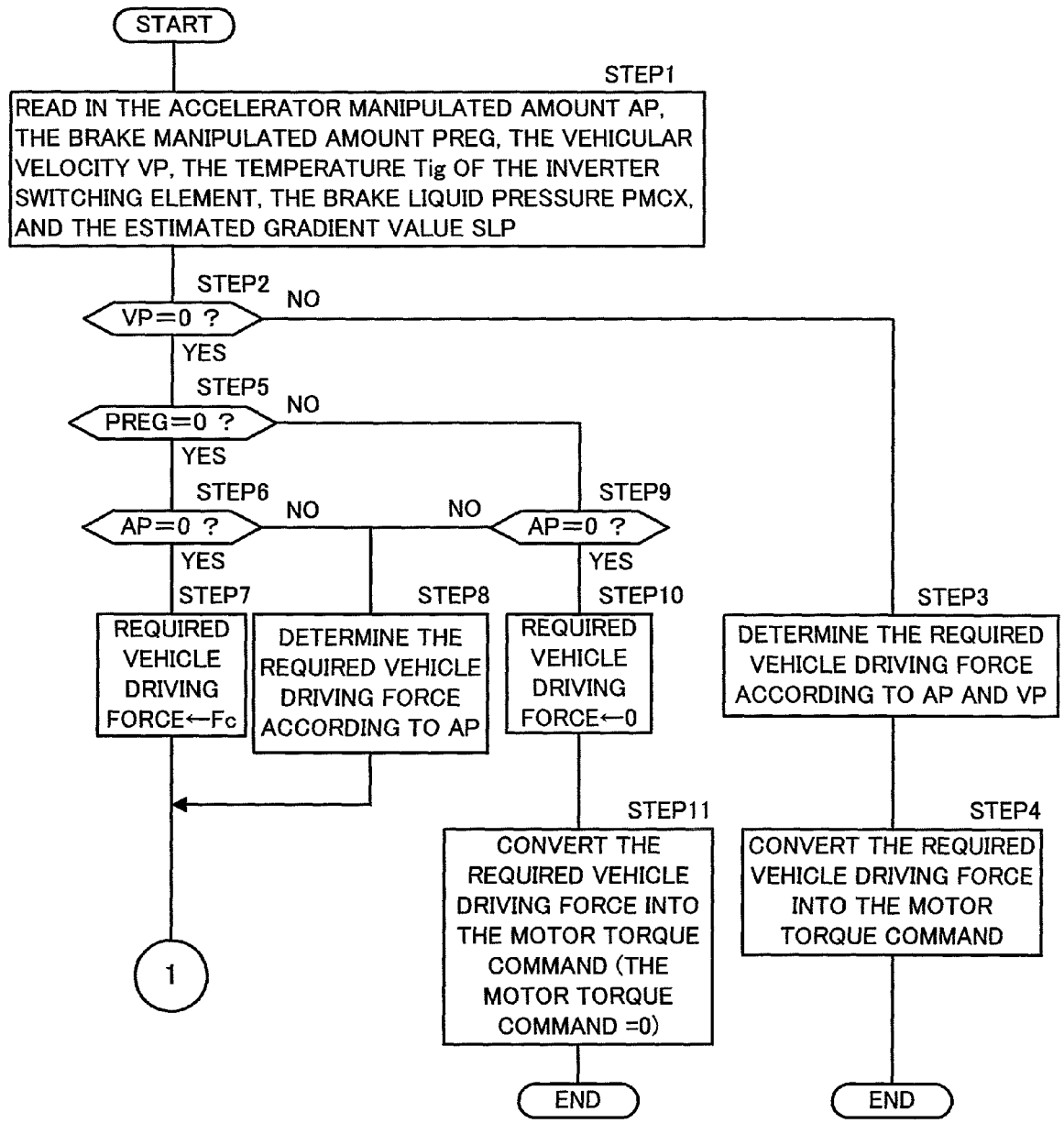
FIG. 3 is a flow chart illustrating a control processing of a management ECU 36 illustrated in FIG. 1.

The configuration of the inverter circuit 24 included in the motor PDU 22 is illustrated in FIG. 2. The inverter circuit 24 is a 3-phase inverter circuit having a publicly known configuration. The inverter circuit 24 has 3 arm portions (3 phases of U phase, V phase and W phase) comprised of a pair of semiconductor switching elements 25, 25 connected in series and a pair of diodes 26, 26 connected in parallel to the pair of semiconductor switching elements 25, 25 respectively. The inverter circuit 24 is a circuit configured so that the 3 phases of the arm portions are connected in parallel between a pair of power terminals 27, 27 to be applied with the power voltage of the electric motor 2. Each semiconductor switching element 25 is constructed from an insulated gate bipolar transistor (which is called as IGBT), for example.

The mid point of each arm portion of U phase, V phase and W phase of the inverter circuit 24 is connected to the U-phase armature winding 2u, the V-phase armature winding 2v and the W-phase armature winding 2w of the electric motor 2, respectively.

Thus, in order to conduct the power-running operation of the electric motor 2, the direct-current power supplied from the battery 21 between the power terminals 27, 27 via the VCU 23 is converted into the alternating-current power of 3 phases by controlling the on and off of each semiconductor switching element 25 at a required timing determined according to the rotation of the rotor of the electric motor 2. The alternating-current power is supplied to the armature windings 2u, 2v and 2w of the electric motor 2. Thereby, the power-running operation of the electric motor 2 can be conducted.

In order to conduct the power-generating operation (regenerative operation) of the electric motor 2, the alternating-current power of 3 phases in the armature windings 2u, 2v and 2w of the electric motor 2 is converted into the direct-current power by controlling the on and off of each semiconductor switching element 25 at a required timing determined according to the rotation of the rotor of the electric motor 2. The direct-current power is supplied (charged) to the battery 21 from the power terminals 27, 27. Thereby, the power-generating operation (regenerative operation) of the electric motor 2 can be conducted.

Referring back to FIG. 1, the generator 3 is electrically connected to the battery 21 through the intermediary of a power drive unit 30 (hereinafter, referred to as the generator PDU 30) having the same configuration as the motor PDU 22 and the VCU 23. Similar to the electric motor 2, the power transfer is conducted between the generator 3 and the battery 21 through the generator PDU 30 by controlling the on and off of each semiconductor switching element in the inverter circuit of the generator PDU 30. Consequently, it is possible to conduct the power-generating operation or the power-running operation of the generator 3.

Further, the vehicle 1 is provided with a motor ECU 31 which is a control unit for conducting an operation control (energization control) of the electric motor 2 through the motor PDU 22, a generator ECU 32 which is a control unit for conducting the operation control (energization control) of the generator 3 through the generator PDU 30, an engine ECU 33 which is a control unit for conducting the operation control of the engine 4 through a throttle vale actuator, a fuel injector, an igniting device (which are not shown in the drawings) of the engine 4, a brake ECU 34 which is a control unit for conducting the operation control of the brake device 10 via the brake motor 13 (controlling the brake liquid pressure to be supplied to each braking force applying member 11), a battery ECU 35 which is a control unit for monitoring the status (charging status or the like) of the battery 21, and a management ECU 36 which is a superior control unit for overall controlling the ECU 31 to ECU 35. Each of the ECU 31 to ECU 36 is an electronic circuit unit comprised of a CPU, a RAM, a ROM and the like.

It is possible for the ECU 31 to ECU 36 to transfer various data mutually. The management ECU 36, on the basis of data (denoting the operation state or the like of the electric motor 2) assigned by the motor ECU 31, the generator ECU 32, the engine ECU 33, the brake ECU 34 and the battery ECU 35 and detection data from various sensors of the vehicle 1, executes a processing to generate command data instructing the operations of the electric motor 2, the generator 3, the engine 4 and the brake device 10. The command data are assigned respectively to the motor ECU 31, the generator ECU 32, the engine ECU 33 and the brake ECU 34.

The motor ECU 31, the generator ECU 32, the engine ECU 33 and the brake ECU 34 conduct respectively the operation controls of the electric motor 2, the generator 3, the engine 4 and the brake device 10 according to the assigned command data.

In the present embodiment, in order to execute the control processing of the present invention in the management ECU 36, the management ECU 36 is assigned with a manipulated amount AP of an accelerator pedal (not shown) in the vehicle 1 (hereinafter, referred to as the accelerator manipulated amount AP), a manipulated amount PREG of the brake pedal 14 (hereinafter, referred to as the brake manipulated amount PREG), a vehicular velocity VP, a temperature Tig of the semiconductor switching element 25 of the inverter circuit 24 of the motor PDU 22 (hereinafter, referred to as the inverter switching element temperature Tig) and a detection data of the brake liquid pressure PMCX to be supplied to the braking force applying member 11 from an appropriate sensor (or from any of the ECU 31 to ECU 34). Further, the management ECU 36 is input with an estimated value of gradient SLP (hereinafter, referred to as the estimated gradient value SLP) of a road (on which the vehicle is travelling) which is calculated by a gradient estimator (not shown).

The management ECU 36 executes a necessary arithmetic processing by using the input data. Accordingly, the management ECU 36 generates a motor torque command which is a command value of the output torque of the electric motor 2 and a braking force command which is a command value of the braking force of the vehicle 1 applied by the brake device 10. The motor torque command and the braking force command are output to the motor ECU 31 and the brake ECU 34, respectively.

More specifically, the inverter switching element temperature Tig is the temperature of a semiconductor switching element 25 having the highest temperature among the semiconductor switching elements 25 in the inverter circuit 24 of the motor PDU 22 or the temperature of a predetermined portion of the motor PDU 22 which is roughly equivalent to the semiconductor switching element 25.

The estimated gradient value SLP is a road gradient estimated from the vehicular velocity VP and a detection data of an acceleration α in the proceeding direction of the vehicle according to a publicly known method. For example, the estimated gradient value SLP can be calculated according to the following equation (1) from an air resistance Ra calculated according to the following equation (1a), a rolling resistance Rr calculated according to the following equation (1b), an acceleration resistance Rc calculated according to the following equation (1c), and a required vehicle driving force (a required value of a driving force for the overall vehicle 1).

$$\text{air resistance } Ra = \lambda \times S \times VP2 \tag{1a}$$

Wherein, λ: air resistance coefficient, S: front projection area of the vehicle 1

$$\text{rolling resistance } Rr = W \times \mu \tag{1b}$$

Wherein, W: weight of the vehicle 1, μ: rolling resistance coefficient $$\text{acceleration resistance } Rc = \alpha \times W \tag{1c}$$

$$\text{estimated gradient value SLP [rad]} = \{\text{required vehicle driving force} - (Ra + Rr + Rc)\}/(W \times g) \tag{1}$$

Wherein, g: gravitational acceleration constant

The required vehicle driving force in the equation (1) is determined by the management ECU 36 sequentially in a predetermined arithmetic processing cycle, and as the value thereof, a value calculated in a previous arithmetic processing cycle (previous value) is used. In the equation (1), approximately sin(SLP)≈SLP.

Supplementally, it is acceptable to calculate the estimated gradient value SLP in the management ECU 36.

The control processing according to the present invention will be described hereinafter. The management ECU 36 generates the torque command of the electric motor 2 and the braking force command of the brake device 10 by executing sequentially the processing illustrated by the flow chart in FIG. 3 to FIG. 5 in a predetermined arithmetic processing cycle.

As to be described hereinafter, at STEP 1, the management ECU 36 reads in the accelerator manipulated amount AP, the brake manipulated amount PREG, the vehicular velocity VP, the inverter switching element temperature Tig and the detection value of the brake liquid pressure PMCX together with the estimated gradient value SLP.

Subsequently, at STEP 2, the management ECU 36 determines whether or not the detection value of the vehicular velocity VP is equal to zero (More specifically, whether or not the detection value of the vehicular velocity VP is in a predetermined range nearby zero).

If the determination result of STEP 2 is negative, the management ECU 36 subsequently executes the processing of STEP 3 and the processing of STEP 4, and terminates the processing of the current arithmetic processing cycle. At the STEP 3, the management ECU 36 determines the required vehicle driving force (a required value of a driving force for the overall vehicle 1) according to the detection value of the accelerator manipulated amount AP and the detection value of the vehicular velocity VP. Here, for example, the required vehicle driving force may be determined on the basis of a preliminarily prepared map denoting a relationship between the required vehicle driving force and AP and VP. More specifically, the required vehicle driving force is denoted as, for example, a required value of a translational force acting on the vehicle 1 in the proceeding direction of the vehicle 1.

At the STEP 4, the management ECU 36 converts the required vehicle driving force determined at STEP 3 into a motor torque command. Specifically, the management ECU 36 calculates the total driving torque of the driving wheels 7, 7 by multiplying the required vehicle driving force by an effective radius of the driving wheel 7. Thereafter, the management ECU 36 calculates the motor torque command by dividing the driving torque by a reduction ratio of the power transmission system from the electric motor 2 to the driving wheels 7, 7.

It is acceptable to determine the required vehicle driving force according to a dimension of a required torque which has been converted into the output torque of the electric motor 2 at STEP 3. In this case, it is acceptable that the required vehicle driving force itself is determined as the motor torque command at STEP 4. Thereby, the processing of STEP 4 is substantially unnecessary.

If the determination result of STEP 2 is affirmative, the management ECU 36 subsequently determines whether or not the detection value of the brake manipulated amount PREG is equal to zero (whether or not the brake pedal 14 is manipulated) at STEP 5.

If the determination result of STEP 5 is affirmative, the management ECU 36 subsequently determines whether or not the detection value of the accelerator manipulated amount AP is equal to zero (whether or not the accelerator is manipulated) at STEP 6. If the determination result of STEP 5 is negative, the management ECU 36 subsequently determines whether or not the detection value of the accelerator manipulated amount AP is equal to zero (whether or not the accelerator is manipulated) at STEP 9.

If the determination result of STEP 9 is affirmative (the driver of the vehicle 1 is stopping the vehicle 1 by manipulating the brake pedal 14 without manipulating the accelerator pedal), the management ECU 36 sets the required vehicle driving force to zero at STEP 10. Thereafter, the management ECU 36 converts the required vehicle driving force into the motor torque command at STEP 11, and terminates the processing of the current arithmetic processing cycle. In this case, since the required vehicle driving force is equal to zero, the motor torque command is also determined as being equal to zero.

On the other hand, if the determination result of STEP 6 is affirmative, a predetermined value Fc is set as the required vehicle driving force at STEP 7 subsequently. In the present embodiment, when both the accelerator pedal and the brake pedal 14 are not manipulated, a so-called creep torque (a torque for generating a minute driving force for the vehicle 1) is being applied to the driving wheels 7, 7 of the vehicle 1. Thereby, the predetermined value Fc is a defined value of the driving force of the vehicle 1 which is equivalent to the creep torque.

If either the determination result of STEP 6 or the determination result of STEP 9 is negative, namely when the driver is manipulating the accelerator pedal as the vehicle 1 is in the stopped state or almost in the stopped state, the management ECU 36 determines the required vehicle driving force according to the detection value of the accelerator manipulated amount AP at STEP 8. Here, for example, by setting the vehicular velocity VP to zero in the map used at STEP 3, the required vehicle driving force is determined from the detection value of AP.

According to the above-mentioned processing from STEP 1 to STEP 11, in the vehicle 1 of the present embodiment, in the state where the determination result of STEP 2 becomes affirmative (the vehicle 1 is in the stopped state or almost in the stopped state), if the detection value of PREG is equal to zero (the brake pedal 14 is not manipulated) and if both the detection value of PREG and the detection value of AP are not equal to zero (the brake pedal 14 and the accelerator pedal are being manipulated), the required vehicle driving force is set to a nonzero value, namely a driving force should be generated for the vehicle 1. Thus, in the present embodiment, the situation where the required vehicle driving force is determined at STEP 7 or STEP 8 as mentioned above is equivalent to the stall state of the vehicle 1.

The stall state of the vehicle 1 occurs when the vehicle 1 is on a sloping road.

Figure 4:
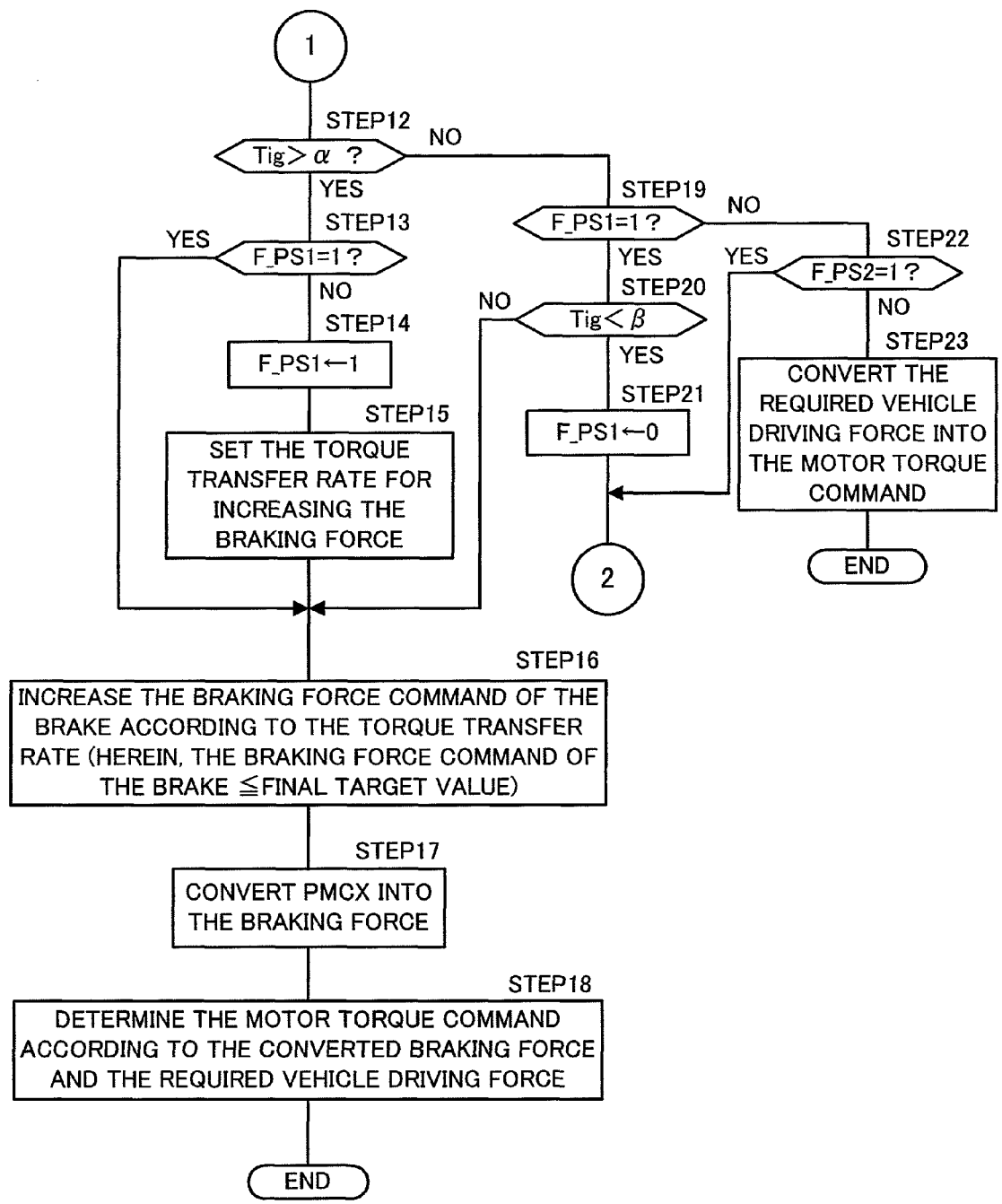
FIG. 4 is a flow chart illustrating a control processing of a management ECU 36 illustrated in FIG. 1.
Figure 5:
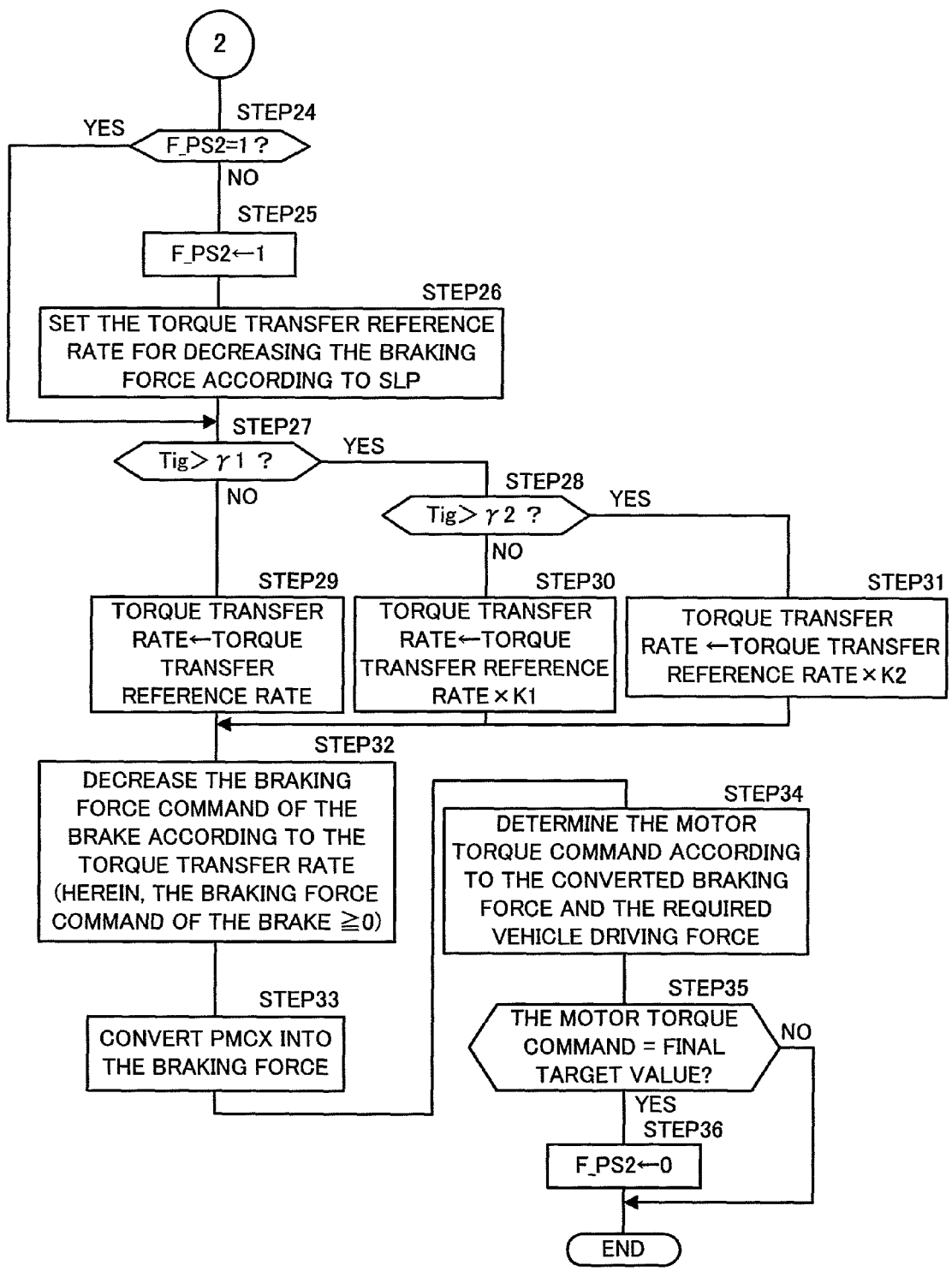
FIG. 5 is a flow chart illustrating a control processing of a management ECU 36 illustrated in FIG. 1.

In the stall state of the vehicle 1, the management ECU 36 executes the processing illustrated by the flow charts of FIG. 4 and FIG. 5 after executing the processing of STEP 7 or STEP 8 as mentioned above.

Specifically, the management ECU 36 determines whether or not the detection value of the inverter switching element temperature Tig is equal to or higher than a predetermined temperature a which is set preliminarily. The predetermined temperature a is set preliminarily as a temperature slightly lower than an allowable upper limit temperature of each semiconductor switching element 25 in the inverter circuit 24.

If the determination result of STEP 12 is affirmative, the management ECU 36 determines whether or not the value of a flag F_PS1 is equal to "1" at STEP 13. The flag F_PS1 is assigned with the values of "1" and "0" to denote respectively whether or not a processing (hereinafter, referred to as the inverter switching element temperature increasing prevention processing) which decreases the motor torque command while increasing the braking force command so as to prevent the inverter switching element temperature Tig from increasing. The flag F_PS1 is initialized to zero at the startup of the management ECU 36.

If the determination result of STEP 13 is negative, namely the inverter switching element temperature increasing prevention processing has not been started, the management ECU 36 sets the value of the flag F_PS1 to "1", and thereafter sets a torque transfer rate for increasing the braking force at STEP 15.

Here, the torque transfer rate for increasing the braking force refers to a target increasing amount of the braking force command per unit time (or a target decreasing amount of the motor toque command per unit time) in the inverter switching element temperature increasing prevention processing. Generally in the present embodiment, the magnitude of the target increasing amount (>0) of the braking force command per unit time is set the same as the magnitude of the target decreasing amount (<0) of the motor toque command per unit time in the inverter switching element temperature increasing prevention processing, and the magnitude is equivalent to the torque transfer rate.

In the present embodiment, the management ECU 36 sets the torque transfer rate for increasing the braking force to for example a preliminarily predetermined value at STEP 15. However, it is acceptable to set the torque transfer rate variable according to a previous value (the value determined in the previous arithmetic processing cycle) of the motor torque command. For example, it is acceptable to set the magnitude of the torque transfer rate greater as the previous value of the motor torque command becomes greater.

If the determination result of STEP 13 is affirmative, or after the processing of STEP 15 has been executed as mentioned above, the management ECU 36 subsequently executes the processing of STEP 16. At STEP 16, the management ECU 36 increases the braking force command according to the torque transfer rate determined at STEP 15.

Specifically, the management ECU 36 determines a current value (the value determined in the current arithmetic processing cycle) of the braking force command by adding to the previous value of the braking force command a value obtained by multiplying one cycle time of the arithmetic processing cycle to the torque transfer rate (>0) for increasing the braking force.

Here, the current value of the required vehicle driving force (the value determined at STEP 7 or STEP 8 in the current arithmetic processing cycle) is set as a final target value of the braking force command. The current value of the braking force command is limited to be equal or smaller than the final target value. In other words, if the sum of the previous value of the braking force command and the value obtained by multiplying one cycle time of the arithmetic processing cycle to the torque transfer rate (>0) for increasing the braking force is greater than the final target value, the current value of the braking force command is set to the final target value (=the required vehicle driving force).

When the vehicle 1 is on a sloping road, the required vehicle driving force determined at STEP 7 or STEP 8 is equivalent to a driving force which balances a force (=gravity×sin(road gradient)) resulted from the gravity acting on the vehicle 1 to urge the vehicle 1 back down the sloping road. Therefore, the final target value of the braking force command is equivalent to the minimum braking force required to oppose the force urging the vehicle 1 back down the sloping road.

Thereafter, the management ECU 36 converts the detection value of the brake liquid pressure PMCX into the braking force at STEP 17. In other words, the management ECU 36 calculates the braking force of the vehicle generated by the current brake liquid pressure PMCX. The conversion is conducted by using a predetermined arithmetic expression or a data table. The calculated braking force is equivalent to the estimated value of the actual braking force for the vehicle 1 currently generated by the brake device 10.

Then, the management ECU 36 executes the processing of STEP 18 and terminates the processing of the current arithmetic processing cycle. At STEP 18, the management ECU 36 determines the motor torque command on the basis of the braking force determined at STEP 17 and the current value of the required vehicle driving force.

Specifically, the management ECU 36 subtracts the braking force determined at STEP 17 from the required vehicle driving force and uses the difference as the driving force of the vehicle 1 which should be borne by the electric motor 2. The management ECU 36 calculates the total driving torque of the driving wheels 7, 7 by multiplying the driving force by the effective radius of the driving wheel 7. Thereafter, the management ECU 36 calculates the motor torque command by dividing the driving torque by the reduction ratio of the power transmission system from the electric motor 2 to the driving wheels 7, 7. Therefore, the motor torque command is determined so as to match the sum of the driving force of the vehicle 1 produced when an output torque equal to the motor torque command is generated from the electric motor 2 and the braking force with the required vehicle driving force.

At STEP 18, in place of the braking force determined at STEP 17, for example, it is acceptable to determine the motor torque command by using the braking force command (the previous value or the current value) determined at STEP 16. It is also acceptable to determine the motor torque command by decreasing the motor torque command (however, the motor torque command ≥0) according to a torque transfer rate (<0) having a reverse sign to the torque transfer rate determined at STEP 15.

However, the control of the braking force of the brake device 10 tends to generate a response delay than in the control of the output torque of the electric motor 2. Under the consideration of this fact, in the present embodiment, the motor torque command is determined by using the braking force converted from the detection value of the brake liquid pressure PMCX at STEP 18.

If the determination result of STEP 12 is negative, the management ECU 36 determines whether or not the value of the flag F_PS1 is equal to "1", namely whether or not the inverter switching element temperature increasing prevention processing is being executed at STEP 19. If the determination result is affirmative, the management ECU 36 advances to STEP 20 to determine whether or not the detection value of the inverter switching element temperature Tig is lower than a predetermined temperature $\beta$. The predetermined temperature $\beta$ is set as being slightly lower than the predetermined temperature $\alpha$.

If the determination result of STEP 20 is negative, the management ECU 36 executes the processing from STEP 16 as mentioned above.

Thereby, in the present embodiment, after the inverter switching element temperature Tig has increased higher than the predetermined temperature $\alpha$ until it drops lower than the predetermined temperature $\beta(<\alpha)$, the inverter switching element temperature increasing prevention processing which increases the braking force command and decreases the motor torque command will be executed.

If the determination result of STEP 20 is affirmative, the management ECU 36 resets the value of the flag F_PS1 to zero at STEP 21, and thereafter executes a processing which decreases the braking force command while increasing (restoring) the motor torque command (hereinafter, referred to as the motor and brake restoration processing), namely the processing illustrated by the flow chart of FIG. 5 which will be described later.

If the determination result of STEP 19 is negative (the inverter switching element temperature increasing prevention processing is not in execution), the management ECU 36 determines whether or not the value of a flag F_PS2, which is assigned with the values of "1" and "0" to denote respectively whether or not the motor and brake restoration processing is being executed, is equal to "1" at STEP 22. If the determination result is affirmative, the management ECU 36 executes the processing illustrated by the flow chart of FIG. 5 (the motor and brake restoration processing). The flag F_PS2 is initialized to zero at the startup of the management ECU 36.

If the determination result is negative at STEP 22, the management ECU 36 converts the required vehicle driving force (the current value) determined at STEP 7 or STEP 8 into the motor torque command. The processing is the same as the processing of STEP 4.

Hereinafter, with reference to FIG. 5, the motor and brake restoration processing will be described in detail. In the motor and brake restoration processing, the management ECU 36 firstly determines whether or not the value of the flag F_PS2 is equal to "1" at STEP 24. If the determination result is negative, the management ECU 36 sets the value of the flag F_PS2 to "1" so as to initiate the motor and brake restoration processing, and thereafter executes the processing of STEP 26. At STEP 26, the management ECU 36 sets a torque transfer reference rate for decreasing the braking force according to the estimated gradient value SLP of the road.

Here, the torque transfer reference rate for decreasing the braking force refers to a normal target decreasing amount of the braking force command per unit time (or a normal target increasing amount of the motor toque command per unit time) in the motor and brake restoration processing. Generally in the present embodiment, the magnitude of the normal target decreasing amount (<0) of the braking force command per unit time is set the same as the magnitude of the normal target increasing amount (>0) of the motor toque command per unit time in the motor and brake restoration processing, and the magnitude is equivalent to the torque transfer reference rate.

Figure 6:
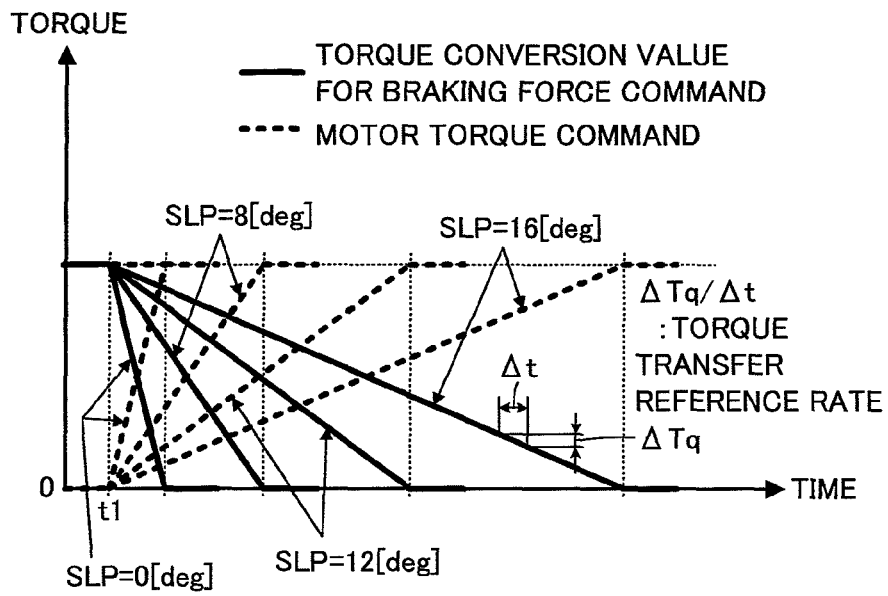
FIG. 6 is a graph for explaining an example of a torque transfer reference rate set at STEP 26 of FIG. 5.

The torque transfer reference rate is set to have an inclination illustrated by for example the graph of FIG. 6 with respect to the estimated gradient value SLP. In the diagram, the graph in solid line and the graph in dashed line exemplify a decreasing pattern of a torque conversion value of the braking force command and an increasing pattern of the motor torque command respectively after the motor and brake restoration processing has been started from the timing t1. The torque conversion value of the braking force command refers to a converted value of the braking force of the vehicle of the braking force command into the output torque of the electric motor 2. Therefore, the magnitude of a driving force produced in the vehicle 1 when the output torque related to the torque conversion value is generated by the electric motor 2 matches the magnitude of the braking force command.

Here, the inclination of the graph in solid line in the drawing (ΔTq/Δt in the drawing) denotes the torque transfer reference rate for decreasing the braking force. As illustrated in the diagram, the torque transfer reference rate is defined in such a way that the magnitude thereof is smaller as the estimated gradient value SLP becomes greater. For convenience, the graphs in the diagram are drawn in such a way that even though the estimated gradient value SLP holds any value in the diagram, the required vehicle driving force (the driving force having the same magnitude as the braking force command prior to the timing t1) holds the same value.

If the determination result of STEP 24 is affirmative, or after the processing of STEP 26 has been executed, the management ECU 36 subsequently sets the torque transfer rate for decreasing the braking force to be used actually in the motor and brake restoration processing by correcting appropriately the torque transfer reference rate according to the detection value of the inverter switching element temperature Tig from STEP 27 to STEP 31.

Specifically, the management ECU 36 determines whether or not Tig is higher than a predetermined temperature $\gamma 1$ at STEP 27. If the determination result is affirmative, the management ECU 36 subsequently determines whether or not Tig is higher than a predetermined temperature $\gamma 2$ at STEP 28.

Figure 7:
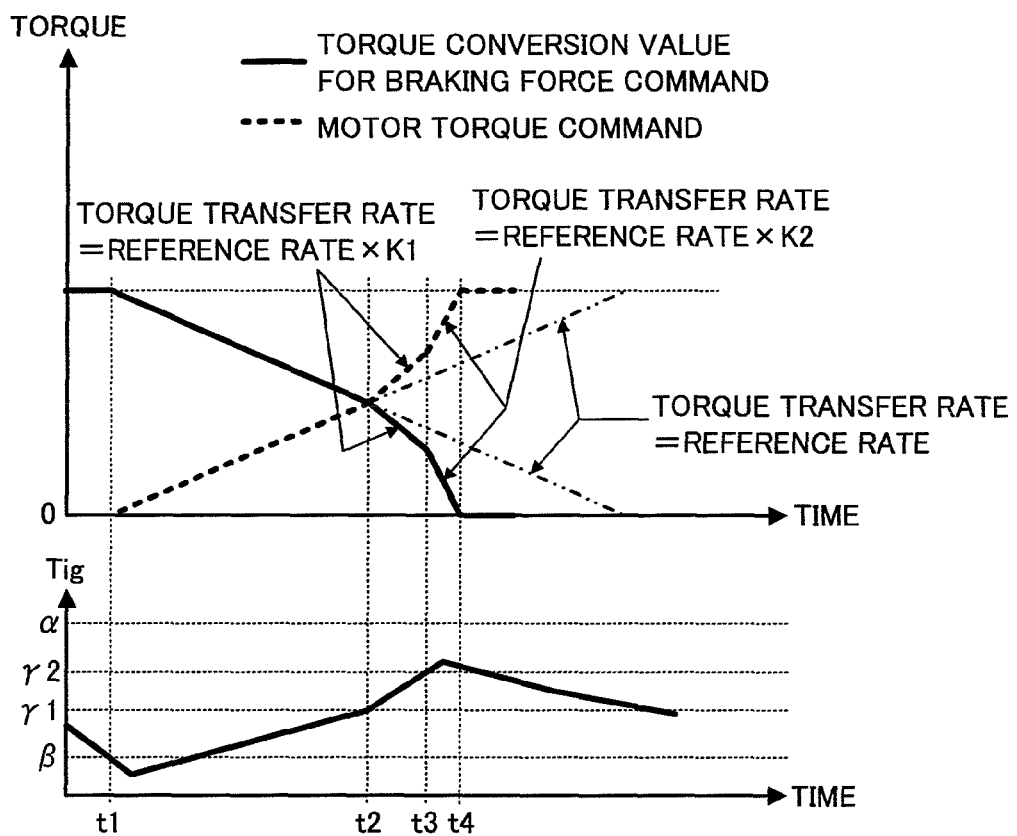
FIG. 7 is a graph for explaining an example of a torque transfer rate set from STEP 29 to STEP 31 of FIG. 5.

The predetermined temperatures $\gamma 1$ and $\gamma 2$ here are temperatures preliminarily defined between the predetermined temperatures $\alpha$ and $\beta$ used in the above-mentioned STEP 12 and STEP 20 respectively in the order of $\alpha > \gamma 2 > \gamma 1 > \beta$, as illustrated in FIG. 7.

If the determination result of STEP 27 is negative (Tig≤$\gamma 1$), the management ECU 36 sets the torque transfer reference rate determined at STEP 26 as the torque transfer rate for decreasing the braking force.

If the determination result of STEP 27 is affirmative and the determination result of STEP 28 is negative ($\gamma 1$<Tig≤$\gamma 2$), the management ECU 36 sets a value obtained by multiplying the torque transfer reference rate determined at STEP 26 by a coefficient K1 having a predetermined value (>1) as the torque transfer rate for decreasing the braking force. In other words, the management ECU 36 sets the torque transfer rate to such a value that the magnitude thereof is slightly greater than the torque transfer reference rate.

If the determination result of STEP 28 is affirmative (Tig>$\gamma 2$), the management ECU 36 sets a value obtained by multiplying the torque transfer reference rate determined at STEP 26 by a coefficient K2 having a predetermined value (>K1>1) greater than the coefficient K1 as the torque transfer rate for decreasing the braking force. In other words, the management ECU 36 sets the torque transfer rate to such a value that the magnitude thereof is further greater than (the torque transfer reference rate×K1).

Therefore, at STEP 27 to STEP 31, the torque transfer rate for decreasing the braking force is set in such a way that the magnitude thereof is greater as Tig becomes higher (approaches closer to the predetermined temperature a).

FIG. 7 is a diagram illustrating the torque transfer rate set as mentioned above. In the diagram, the graph in solid line and the graph in dashed line exemplify a decreasing pattern of a torque conversion value of the braking force command and an increasing pattern of the motor torque command respectively after the motor and brake restoration processing has been started from the timing t1. In FIG. 7, the inclination of the graph in solid line when Tig≤$\gamma 1$ (the period from the timing t1 to t2) is equivalent to the torque transfer rate (=the torque transfer reference rate) set at STEP 29. The inclination of the graph in solid line when $\gamma 1$<Tig≤$\gamma 2$ (the period from the timing t2 to t3) is equivalent to the torque transfer rate (=the torque transfer reference rate×K1) set at STEP 30. The inclination of the graph in solid line when Tig>$\gamma 2$ (the period from the timing t3 to t4) is equivalent to the torque transfer rate (=the torque transfer reference rate×K2) set at STEP 31.

In FIG. 7, it is supposed that the vehicle 1 is started and the rotor of the electric motor 2 is rotated after the timing t3, thereby, Tig decreases after the timing t3.

After setting the torque transfer rate for decreasing the braking force as mention above, the management ECU 36 executes the processing of STEP 32. At STEP 32, the management ECU 36 decreases the braking force command according to the torque transfer rate determined at any step from STEP 29 to STEP 31.

Specifically, the management ECU 36 determines the current value (the value determined in the current arithmetic processing cycle) of the braking force command by adding to the previous value of the braking force command a value obtained by multiplying one cycle time of the arithmetic processing cycle to the torque transfer rate (<0) for decreasing the braking force.

Here, the current value of the braking force command is limited with "0" as the lower limit value, and if the sum of the previous value of the braking force command and the value obtained by multiplying one cycle time of the arithmetic processing cycle to the torque transfer rate (<0) for decreasing the braking force is smaller than "0", the current value of the braking force command is set to "0".

Thereafter, the management ECU 36 executes the same processes at STEP 33 and 34 as those at STEP 17 and 18 in the inverter switching element temperature increasing prevention processing respectively to determine the motor torque command.

Specifically, the motor torque command is determined so as to match the sum of the driving force of the vehicle 1 produced when an output torque equal to the motor torque command is generated from the electric motor 2 and the braking force with the required vehicle driving force.

At STEP 34, in place of the braking force determined at STEP 33, for example, it is acceptable to determine the motor torque command by using the braking force command (the previous value or the current value) determined at STEP 32. It is also acceptable to determine the motor torque command by increasing the motor torque command according to a torque transfer rate (>0) having a reverse sign to the torque transfer rate determined at any step from STEP 29 to STEP 31.

Thereafter, the management ECU 36 determines whether or not the motor torque command has reached the final target value in the motor and brake restoration processing. The final target value of the motor torque command is equal to the output torque of the electric motor 2 when the driving force of the vehicle 1 generated by the electric motor 2 is made to match with the required vehicle driving force.

If the determination result of STEP 35 is negative, the processing of the current arithmetic processing cycle is terminated. If the determination result of STEP 35 is affirmative, the management ECU 36 resets the value of the flag F_PS2 to "0" at STEP 36 so as to initiate the motor and brake restoration processing and terminates the processing of the current arithmetic processing cycle.

The detail of the processing (the processing related to the present invention) executed by the management ECU 36 in the present embodiment has been described in the above.

The motor torque command and the braking command determined by the management ECU 36 according to the above-mentioned processing are assigned to the motor ECU 31 and the brake ECU 34, respectively. The motor ECU 31, on the basis of the assigned motor torque command and the detection value of a rotation velocity of the rotor of the electric motor 2, determines a target value of the flowing current in the armature windings of the electric motor 2. Thereafter, the motor ECU 31 determines a control command for defining the on and off operation of each semiconductor switching element 25 of the inverter circuit 24 of the motor PDU 22 so as to match the detection value of the flowing current in the armature windings with the target value. Then, the motor ECU 31 control the flowing current in the armature windings of the electric motor 2 by controlling the motor PDU 22 according to the control command. By doing so, the output torque of the electric motor 2 is controlled according to the motor torque command.

The brake ECU 34, on the basis of the assigned braking force command, determines a target value of the brake liquid pressure PMCX to be generated by the motor cylinder of the brake device 10. Then, the brake ECU 34 controls the operation of the brake motor 13 so as to achieve the target value of the brake liquid pressure PMCX.

The examples of temporal variation patterns of the motor torque command, the braking force command and the like determined according to the control processing of the present embodiment as described above are illustrated in FIG. 8 and FIG. 9.

Figure 8:
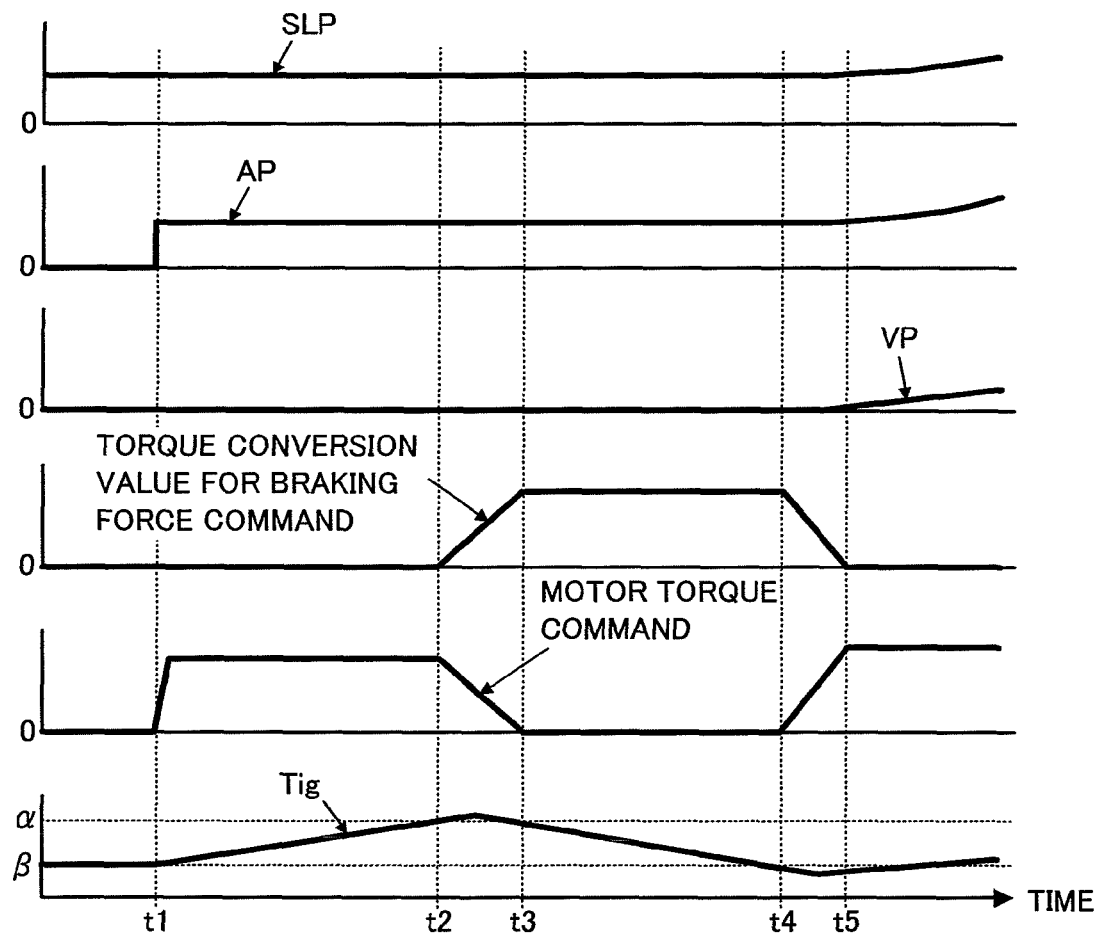
FIG. 8 is a time chart illustrating an example of a braking force command, a motor torque command and the like varied with time.

FIG. 8 illustrates a state where the accelerator pedal has been stepped with a substantially constant accelerator manipulated amount AP at the timing t1 after the vehicle 1 is stopped on a sloping road (ascending slope) having a gradient according to the operation of the brake pedal 14. In the example, the period from the timing t1 to the timing t3 is equivalent to the stall state of the vehicle 1, and the vehicle 1 is maintained at the stopped state substantially. Moreover, the inverter switching element temperature Tig is maintained at a temperature lower than the predetermined temperature a from the timing t1 to t2.

In this case, the required vehicle driving force is determined substantially constant according to the processing of STEP 8 from the timing t1 immediately after the timing t4. Since the inverter switching element temperature Tig is still lower than the predetermined temperature $\alpha$, the inverter switching element temperature increasing prevention processing is not yet started. In this state, the motor torque command is determined according to the processing of STEP 23. Thereby, as illustrated by the graph in the period from the timing t1 to t2, the motor torque command increases to such a torque command value that the driving force generated by the output torque of the electric motor 2 for the vehicle 1 matches the required vehicle driving force, and is maintained at the torque command value.

In this state, a relatively great current is conducted intensively into any of the semiconductor switching elements 25 of the inverter circuit 24 of the motor PDU 22. Thereby, the inverter switching element temperature Tig increases and becomes equal to or greater than the predetermined temperature $\alpha$ at the timing t2.

Therefore, the determination result of STEP 12 becomes affirmative and the inverter switching element temperature increasing prevention processing is started. Thus, as illustrated by the graph, after the timing t2, the braking force command (the torque conversion value of the braking force command in the illustrated graph) is increased gradually and meanwhile the motor torque command is decreased gradually. Here, the decrement of the motor torque command and the increment of the braking force command are conducted so that the resultant force of the driving force generated in the driving wheels 7, 7 of the vehicle 1 in the case where the output torque of the electric motor 2 is matched with the motor torque command and the brake force in the case where the total braking force generated by the brake device 10 is matched with the braking force command matches the required vehicle driving force determined according to the accelerator manipulated amount AP. In other words, a pair of the motor torque command and the braking force command are determined so as to generate in the brake device 10 a braking force which is equivalent to the decreased amount of the motor torque command.

The motor torque command decreases to "0" finally. Thereafter, until the inverter switching element temperature Tig is decreased to be equal to or lower than the predetermined temperature $\beta$, the motor torque command is maintained at "0". Similarly, the braking force command is increased until it has the same magnitude as the required vehicle driving force. Thereafter, until the inverter switching element temperature Tig is decreased to be equal to or lower than the predetermined temperature β, The braking force command is maintained at the same magnitude as the required vehicle driving force.

As mentioned above, the motor torque command is decreased according to inverter switching element temperature increasing prevention processing; thereby, the flowing current in the armature windings of the electric motor 2 decreases. Consequently, the inverter switching element temperature Tig will decrease as illustrated by the graph of FIG. 8. Thus, at the timing t4, Tig drops to be equal to or lower than the predetermined temperature β.

At the moment, since the determination result of STEP 20 is affirmative, the inverter switching element temperature increasing prevention processing is terminated and meanwhile the motor and brake restoration processing is started. Thus, as illustrated by the graph, after the timing t4, the braking force command (the torque conversion value of the braking force command in the illustrated graph) is decreased gradually and meanwhile the motor torque command is increased gradually.

In this case, the braking force command is decreased at a decreasing speed defined by the torque transfer reference rate determined according to the estimated gradient value SLP. Similarly, the motor torque command is increased at an increasing speed defined by the torque transfer reference rate. In the illustrated example, the inverter switching element temperature Tig is configured as being maintained at a temperature lower than the predetermined temperature γ1 in the execution of the motor and brake restoration processing.

Here, similar to the case of the inverter switching element temperature increasing prevention processing, the decrement of the motor torque command and the increment of the braking force command are conducted so that the resultant force of the driving force generated in the driving wheels 7, 7 of the vehicle 1 in the case where the output torque of the electric motor 2 is matched with the motor torque command and the total braking force generated by the brake device 10 in the case where the braking force is matched with the braking force command matches the required vehicle driving force determined according to the accelerator manipulated amount AP. In other words, a pair of the motor torque command and the braking force command are determined so as to generate in the brake device 10 a braking force which is equivalent to the decreased amount of the motor torque command.

In the motor and brake restoration processing, the braking force command is decreased to "0" finally. The motor torque command is increased until the driving force of the vehicle 1 generated under such a condition that the output torque of the electric motor 2 is matched with the motor torque command matches the required vehicle driving force.

Thereby, if the inverter switching element temperature Tig is decreased to be equal to or lower than the predetermined temperature β, the braking force command is decreased and meanwhile the motor torque command is increased. Accordingly, the operation states of the electric motor 2 and the brake device 10 are restored to the same conditions as those before the start of the inverter switching element temperature increasing prevention processing. At this moment, if the driver further steps down the accelerator pedal configured to start up the vehicle 1, as illustrated by FIG. 8, the vehicular velocity VP increases rapidly and the vehicle 1 is started up smoothly.

Therefore, when it is about to start up the vehicle 1 while preventing the inverter switching element temperature Tig from becoming excessively high as the vehicle 1 is in the stall state, by reducing the frequency of exerting the braking force on the vehicle 1 by the brake device 10, it is possible to start up the vehicle 1 smoothly.

FIG. 9 illustrates an example where the inverter switching element temperature increasing prevention processing is started after the timing t1 as the vehicle 1 is in the stall state and thereafter the motor and brake restoration processing is started after the timing t2. In the example, the accelerator pedal is further stepped down immediately before the end of the inverter switching element temperature increasing prevention processing. Moreover, it is supposed that the inverter switching element temperature Tig is increased equal to or greater than for example the predetermined temperature γ1 of the predetermined temperatures γ1 and γ2 at the timing t3 in the execution of the motor and brake restoration processing after the timing t2.

In this case, from the timing t2 to t3, the braking force command is decreased at the decreasing speed defined by the torque transfer reference rate determined according to the estimated gradient value SLP. Similarly, the motor torque command is increased at the increasing speed defined by the torque transfer reference rate.

After the timing t3, the braking force command is decreased at a speed (the speed defined by the torque transfer rate equal to the torque transfer reference rate×K1) faster than the decreasing speed defined by the torque transfer reference rate. Similarly, the motor torque command is increased a speed (the speed defined by the torque transfer rate equal to the torque transfer reference rate×K1) faster than the increasing speed defined by the torque transfer reference rate. Thereby, the braking force command decreases to "0" rapidly and the motor torque command increases to a torque capable of generating a driving force equal to the required vehicle driving force. According thereto, it is possible to start up the vehicle 1 smoothly.

The inverter switching element temperature Tig increases along with the increment of the motor torque command; however, the temperature increment is generally slower than the increasing speed of the motor torque command. Therefore, before the inverter switching element temperature Tig has been increased to the predetermined temperature α at which the inverter switching element temperature increasing prevention processing starts, the motor torque command may have been increased sufficiently. Thereby, as illustrated by the graph of FIG. 9, it is possible to start up the vehicle 1 before the inverter switching element temperature increasing prevention processing is re-started. If the vehicle 1 is started up, the rotor of the electric motor 2 rotates; thereby, the state where a relatively great current is conducted intensively into any of the semiconductor switching elements 25 of the inverter circuit 24 is released. Consequently, the inverter switching element temperature Tig can be prevented from increasing to an excessively high temperature.

As mentioned in the above, according to the present embodiment, when it is about to start up the vehicle 1 while preventing the inverter switching element temperature Tig from becoming excessively high as the vehicle 1 is in the stall state, by reducing the frequency of exerting the braking force on the vehicle 1 by the brake device 10, it is possible to start up the vehicle 1 smoothly.

According to the present embodiment, in the motor and brake restoration processing, the torque transfer reference rate for defining the normal decreasing speed (the decreasing amount per unit time) of the braking force command and the normal increasing speed (the increasing amount per unit time) of the motor torque command is determined according to the estimated gradient value SLP as mentioned in the above. Therefore, if the estimated gradient value SLP is relatively great, the motor torque command may be made to increase relatively slow. Thereby, the output torque of the electric motor can be prevented from being increased rapidly into a torque excessively greater than a required torque (an output torque corresponding to the required vehicle driving torque) for stopping the vehicle on the gradient road. Consequently, it is possible to prevent the vehicle from being started rapidly.

Herein, a supplementary description will be given on the corresponding relationship between the present embodiment described in the above and the present invention.

The inverter circuit 24 of the motor PDU 22 in the present embodiment embodies as a source power supply circuit in the present invention. Thus, the semiconductor switching element 25 of the inverter circuit 24 embodies a switching element in the present invention. The motor ECU 31 embodies an electric motor control unit in the present invention. The motor torque command is equivalent to a torque command in the present invention.

The brake device 10 embodies a brake unit in the present invention and the brake ECU 34 embodies a brake control unit in the present invention. The braking force command is equivalent to a braking force command in the present invention.

The execution of the processing by the management ECU 36 embodies a stall determination unit, a switching element temperature acquiring unit, an electric motor and brake cooperation control unit, a road gradient information acquiring unit, and a required vehicle driving force value determination unit in the present invention.

More specifically, the determination processing of STEP 2, 5, 6, 9 embodies the stall determination unit in the present invention. In this case, after the determination processing of STEP 6 or 9, the state where the processing of STEP 7 or 8 is executed is equivalent to the stall state of the vehicle 1.

The processing of STEP 1 embodies the switching element temperature acquiring unit and the road gradient information acquiring unit in the present invention. In this case, the inverter switching element temperature Tig is equivalent to a temperature of a switching element in the present invention, and the estimated gradient value SLP is equivalent to a gradient information in the present invention.

The processing of STEP 7, 8 embodies the required vehicle driving force value determination unit in the present invention. In this case the required vehicle driving force is equivalent to a required vehicle driving force value in the present invention.

The execution of the processing from STEP 12 to STEP 36 (the processing illustrated by the flow charts in FIG. 4 and FIG. 5) embodies the electric motor and brake cooperation control unit in the present invention. In this case, the inverter switching element temperature increasing prevention processing (the processing from STEP 13 to STEP 18) is equivalent to a first control processing in the present invention. The motor and brake restoration processing (the processing from STEP 24 to STEP 36) is equivalent to a second control processing in the present invention.

The predetermined temperatures α and β are equivalent to a first predetermined value and a second predetermined value respectively in the present invention, and the predetermined temperatures γ1 and γ2 are equivalent to a third predetermined value in the present invention.

It is particularly preferable that the unit for executing the second control processing is configured to generate the torque command so as to make the increasing rate of the output torque of the electric motor smaller as the gradient level becomes greater (Second aspect).

According to the first aspect and the second aspect of the present invention, in the state where the determination result of the stall determination unit is affirmative, when the temperature of the switching element denoted by the detection data acquired by the switching element temperature acquiring unit (hereinafter, simply referred to as the detection temperature of the switching element where appropriate) increases to be equal to or greater than the first predetermined value, the electric motor and brake cooperation control unit executes the first control processing to generate the torque command so as to decrease the output torque of the electric motor and meanwhile generate the braking force command so as to increase the braking force of the brake unit by the amount equivalent to the decreased amount of the output torque of the electric motor.

Thereby, the flowing current in the armature winding of the electric motor is controlled to decrease by the electric motor control unit so as to prevent the detection temperature of the switching element from increasing further. In addition, the braking force of the vehicle from the brake unit is controlled to increase by the brake control unit as mentioned above. According thereto, the stopped state of the vehicle is maintained without the necessity of operating the brake pedal or the accelerator pedal of the vehicle.

Thereafter, when the detection temperature of the switching element decreases to be equal to or less than the second predetermined value due to the execution of the first control processing, the electric motor and brake cooperation control unit executes the second control processing to generate the braking force command so as to decrease the braking force of the brake unit and meanwhile generate the torque command so as to increase the output torque of the electric motor by the amount equivalent to the decreased amount of the braking force of the brake unit.

According thereto, if the detection temperature of the switching element is decreased and there is no need to decrease the output torque of the electric motor, the stopped state of the vehicle is maintained as it was; thus, the operation state of the vehicle is equivalent to being restored to the operation state (the stall state) before the execution of the first control processing. In this state, the braking force by the brake unit is released; thereby, it is possible to start up the vehicle rapidly.

In the second control processing, the torque command is generated so as to vary the increasing rate of the output torque of the electric motor according to the gradient level of the road denoted by the gradient information acquired by the road gradient information acquiring unit. Thereby, the gradient level of the road denoted by the gradient information can be reflected in the increasing rate of the output torque of the electric motor appropriately in the second control processing.

Particularly in the second aspect of the present invention, the torque command is generated so as to make the increasing rate of the output torque of the electric motor smaller as the gradient level becomes greater in the second control processing; thereby, if for example the gradient level of the road denoted by the gradient information is greater than the actual gradient level of the road, the increasing rate of the output torque of the electric motor will become moderate. Thereby, the output torque of the electric motor can be prevented from being increased rapidly into a torque excessively greater than a required torque for stopping the vehicle on the road having the gradient level. Consequently, it is possible to prevent the vehicle from being started rapidly.

However, in the first aspect of the present invention, if for example the gradient level of the road denoted by the gradient information is extremely great, it is possible to execute a processing so as to increase the increasing rate of the output torque of the electric motor by a given speed.

Therefore, according to the first aspect and the second aspect of the present invention, it is possible to automatically maintain the vehicle at the stopped state while preventing a switching element of a circuit configured to supply the electric power to the electric motor serving as a generation source of a driving force of the vehicle from overheating when the vehicle is in a stall state and subsequently start up the vehicle smoothly according to the gradient level of the road.

It is preferable that the first aspect or the second aspect of the present invention is further provided with a required vehicle driving force value determination unit configured to sequentially determine a required vehicle driving force value which is a required value of a driving force of the vehicle at least in the stall state, the units disposed in the electric motor and brake cooperation control unit for executing the first control processing and the second control processing respectively generate the torque command and the braking force command so as to gradually vary, while matching a resultant force of a driving force generated in the vehicle by transmitting the output torque of the electric motor to the driving wheel of the vehicle and a braking force generated by the brake unit with the required vehicle driving force value determined by the required vehicle driving force value determination unit (Third aspect).

According to the third aspect of the present invention, either in the first control processing or in the second control processing, the torque command and the braking force command are generated so as to gradually vary a resultant force of a driving force generated in the vehicle by transmitting the output torque of the electric motor to the driving wheel of the vehicle and a braking force generated by the brake unit, to match the required vehicle driving force value determined by the required vehicle driving force value determination unit. Thereby, it is possible to smoothly vary the output torque of the electric motor and the braking force of the brake unit while keeping the braking force of the vehicle by the brake unit at the minimum braking force necessary for maintaining the vehicle at the stopped state in cooperation with the output torque of the electric motor.

Consequently, it is possible to execute appropriately the first control processing and the second control processing while inhibiting the variation of the total force (the resultant force of the driving force and the braking force) acting on the vehicle or the energy consumption.

In the first aspect to the third aspect of the present invention, it is preferable that the unit for executing the second control processing generates the torque command so as to increase the increasing rate of the output torque of the electric motor further greater than the current increasing rate when the temperature of the switching element denoted by the detection data acquired by the switching element temperature acquiring unit increases to be equal to or greater than a third predetermined value located between the first predetermined value and the second predetermined value (Fourth aspect).

In the fourth aspect of the present invention, as the unit for executing the second control processing generates the torque command so as to increase the increasing rate of the output torque of the electric motor further greater than the current increasing rate, in conformity thereto, the braking force command is generated so as to increase the decreasing rate of the braking force of the brake unit further greater than the current decreasing rate.

According to the fourth aspect of the present invention, during the execution of the second control processing, when the temperature of the switching element has an increasing tendency and the detection temperature of the switching element increases to be equal to or greater than the third predetermined value, the increasing rate of the output torque of the electric motor is increased further greater than the current increasing rate. Thus, before the detection temperature of the switching element increases to be equal to or greater than the first predetermined value again, it is possible to increase the output torque of the electric motor sufficient enough to start up the vehicle. Thereby, it is possible to start up the vehicle smoothly at a phase before the first control processing is re-executed.

In the second control processing of the fourth aspect of the present invention, the variation of the increasing rate of the output torque of the electric motor according to the gradient level of the road denoted by the gradient information acquired by the road gradient information acquiring unit may be conducted as to be described in the following, for example. Specifically, the increasing rate of the output torque of the electric motor before the detection temperature of the switching element increases to be equal to or greater than the third predetermined value is determined as a reference increasing rate according to the gradient level of the road, and the torque command of the electric motor is increased by the reference increasing rate until the detection temperature of the switching element increases to be equal to or greater than the third predetermined value. As the detection temperature of the switching element increases to be equal to or greater than the third predetermined value, the increasing rate of the output torque of the electric motor thereafter is determined by multiplying the reference increasing rate by a predetermined ratio, and the torque command of the electric motor is increased by the obtained increasing rate.

The present invention provides a control method for an electric vehicle provided with an electric motor which serves as a generation source of a driving force of the vehicle, a source power supply circuit which includes a switching element connected to an armature winding of the electric motor and is configured to supply a source power to the electric motor according to an on and off control of the switching element, and a brake unit which generates a mechanical braking force from a brake liquid pressure to brake a wheel of the vehicle. The control method for the electric vehicle comprises steps of: executing a first control processing which controls the output torque of the electric motor and the braking force of the brake unit so as to gradually decrease the output torque of the electric motor and meanwhile gradually increase the braking force of the brake unit by the amount equivalent to the decreased amount of the output torque of the electric motor when the temperature of the switching element denoted by the detection data acquired by the switching element temperature acquiring unit increases to be equal to or greater than a first predetermined value when an operation state of the vehicle is in a stall state in which the vehicle is still in a stopped state even though the output torque serving as the driving force of the vehicle has been transmitted from the electric motor to a driving wheel of the vehicle, and executing a second control processing which controls the output torque of the electric motor and the braking force of the brake unit so as to gradually decrease the braking force of the brake unit and meanwhile gradually increase the output torque of the electric motor by the amount equivalent to the decreased amount of the braking force of the brake unit when the temperature of the switching element denoted by the detection data acquired by the switching element temperature acquiring unit decreases to be equal to or less than a second predetermined value smaller than the first predetermined value after the execution of the first control processing, in the step of executing the second control processing, a gradient information denoting a gradient level of a road on which the vehicle is present is acquired and the torque command is generated so as to vary the increasing rate of the output torque of the electric motor according to the acquired gradient information (Fifth aspect).

According to the fifth aspect of the present invention, similar to the first aspect of the present invention, when the operation state of the vehicle is in the stall state, if the temperature of the switching element in the source power supply circuit increases to be equal to or greater than the first predetermined value, the first control processing is executed. According thereto, the temperature of the switching element can be prevented from increasing further. In addition, the braking force of the vehicle from the brake unit is controlled to increase by the brake control unit as mentioned above. According thereto, the stopped state of the vehicle can be maintained without the necessity of operating the brake pedal or the accelerator pedal of the vehicle.

When the temperature of the switching element decreases to be equal to or less than the second predetermined value due to the execution of the first control processing, the second control processing is executed to decrease the braking force of the brake unit and meanwhile generate the torque command so as to increase the output torque of the electric motor by the amount equivalent to the decreased amount of the braking force of the brake unit.

According thereto, similar to the first aspect of the present invention, if the detection temperature of the switching element is decreased and there is no need to decrease the output torque of the electric motor, the stopped state of the vehicle is maintained as it was; thus, the operation state of the vehicle is equivalent to being restored to the operation state (the stall state) before the execution of the first control processing. In this state, the braking force by the brake unit is released; thereby, it is possible to start up the vehicle rapidly.

In the second control processing, the torque command is generated so as to vary the increasing rate of the output torque of the electric motor according to the gradient level of the road denoted by the gradient information acquired by the road gradient information acquiring unit. Thereby, the gradient level of the road denoted by the gradient information can be reflected in the increasing rate of the output torque of the electric motor appropriately in the second control processing.

For example, it is possible to obtain the same effects as the second aspect of the present invention by generating the torque command so as to make the increasing rate of the output torque of the electric motor smaller as the gradient level becomes greater.

Therefore, according to the fifth aspect of the present invention, it is possible to automatically maintain the vehicle at the stopped state while preventing a switching element of a circuit configured to supply the electric power to the electric motor serving as a generation source of a driving force of the vehicle when the vehicle is in the stall state and subsequently start up the vehicle smoothly.

In the fifth aspect of the present invention, it is acceptable to control the output torque of the electric motor to make the increasing rate of the output torque of the electric motor in the second control processing further greater than the current increasing rate when the temperature of the switching element increases to be equal to or greater than the temperature of the third predetermined value located between the first predetermined value and the second predetermined value during the execution of the second control processing. At the moment, as the increasing rate of the output torque of the electric motor is increased further greater than the current increasing rate, in conformity thereto, the braking force is controlled to make the decreasing rate of the braking force of the brake unit increase further greater than the current decreasing rate.

Thus, before the detection temperature of the switching element increases to be equal to or greater than the first predetermined value again, it is possible to increase the output torque of the electric motor sufficient enough to start up the vehicle. Thereby, it is possible to start up the vehicle smoothly at a phase before the first control processing is re-executed.

In the embodiment described above, the electric vehicle 1 is exemplified to have the engine 4 and the generator 3; however, it may be an electric vehicle without the engine 4 and the generator 3.

The invention claimed is:

1. A control device of an electric vehicle provided with an electric motor which serves as a generation source of a driving force of the vehicle, a source power supply circuit which includes a switching element connected to an armature winding of the electric motor and is configured to supply a source power to the electric motor according to an on and off control of the switching element, an electric motor control unit which controls a flowing current in the armature winding of the electric motor according to a torque command serving as a command value of an output torque of the electric motor via the source power supply circuit, a brake unit which generates a mechanical braking force from a brake liquid pressure to brake a wheel of the vehicle, and a brake control unit which controls the braking force generated by the brake unit according to a braking force command serving as a command value of the braking force, comprising:

a stall determination unit configured to determine whether or not an operation state of the vehicle is in a stall state in which the vehicle is still in a stopped state even though the output torque serving as the driving force of the vehicle has been transmitted from the electric motor to a driving wheel of the vehicle;

a switching element temperature acquiring unit configured to acquire a detection data of a temperature of a switching element in the source power supply circuit;

an electric motor and brake cooperation control unit configured to generate the torque command to be supplied to the electric motor control unit and the braking force command to be supplied to the brake control unit so as to coordinate the operations of the electric motor and the brake unit; and a road gradient information acquiring unit configured to acquire a gradient information denoting a gradient level of a road on which the vehicle is present, wherein the electric motor and brake cooperation control unit is provided with a unit for executing a first control processing which generates the torque command so as to gradually decrease the output torque of the electric motor to zero and meanwhile generates the braking force command so as to increase the braking force of the brake unit by the amount equivalent to the decreased amount of the output torque of the electric motor when the temperature of the switching element denoted by the detection data acquired by the switching element temperature acquiring unit increases to be equal to or greater than a first predetermined value when the determination result by the stall determination unit is affirmative, and a unit for executing a second control processing which generates the braking force command so as to gradually decrease the braking force of the brake unit to zero and meanwhile generates the torque command so as to increase the output torque of the electric motor by the amount equivalent to the decreased amount of the braking force of the brake unit when the temperature of the switching element denoted by the detection data acquired by the switching element temperature acquiring unit decreases to be equal to or less than a second predetermined value smaller than the first predetermined value after the execution of the first control processing, and wherein the unit for executing the second control processing is configured to select one of a plurality of increasing rates of the output torque of the electric motor according to the gradient level of the road denoted by the gradient information acquired by the road gradient information acquiring unit, and generate the torque command in accordance with the selected increasing rate.

2. The control device of the electric vehicle according to claim 1, wherein the unit for executing the second control processing is configured to generate the torque command so as to make the increasing rate of the output torque of the electric motor smaller as the gradient level becomes greater.

3. The control device of the electric vehicle according to claim 1, further provided with a required vehicle driving force value determination unit configured to sequentially determine a required vehicle driving force value which is a required value of a driving force of the vehicle at least in the stall state, the units disposed in the electric motor and brake cooperation control unit for executing the first control processing and the second control processing respectively generate the torque command and the braking force command so as to vary, while matching a resultant force of a driving force generated in the vehicle by transmitting the output torque of the electric motor to the driving wheel of the vehicle and a braking force generated by the brake unit with the required vehicle driving force value determined by the required vehicle driving force value determination unit.

4. The control device of the electric vehicle according to claim 1, wherein
the unit for executing the second control processing generates the torque command so as to further increase the increasing rate of the output torque of the electric motor to be greater than the current increasing rate when the temperature of the switching element denoted by the detection data acquired by the switching element temperature acquiring unit increases to be equal to or greater than a third predetermined value located between the first predetermined value and the second predetermined value.

5. A control method of an electric vehicle provided with an electric motor which serves as a generation source of a driving force of the vehicle, a source power supply circuit which includes a switching element connected to an armature winding of the electric motor and is configured to supply a source power to the electric motor according to an on and off control of the switching element, and a brake unit which generates a mechanical braking force from a brake liquid pressure to brake a wheel of the vehicle, comprising steps of:

executing a first control processing which controls an output torque of the electric motor and the braking force of the brake unit so as to gradually decrease the output torque of the electric motor to zero and meanwhile increase the braking force of the brake unit by the amount equivalent to the decreased amount of the output torque of the electric motor when a temperature of the switching element denoted by a detection data acquired by a switching element temperature acquiring unit increases to be equal to or greater than a first predetermined value when an operation state of the vehicle is in a stall state in which the vehicle is still in a stopped state even though the output torque serving as the driving force of the vehicle has been transmitted from the electric motor to a driving wheel of the vehicle, and executing a second control processing which controls the output torque of the electric motor and the braking force of the brake unit so as to gradually decrease the braking force of the brake unit to zero and meanwhile increase the output torque of the electric motor by the amount equivalent to the decreased amount of the braking force of the brake unit when the temperature of the switching element denoted by the detection data acquired by the switching element temperature acquiring unit decreases to be equal to or less than a second predetermined value smaller than the first predetermined value after the execution of the first control processing, wherein the step of executing the second control processing further comprises acquiring a gradient information indicating a gradient level of a road on which the vehicle is present and selecting one of a plurality of increasing rates of the output torque of the electric motor according to the acquired gradient information to control the output torque of the electric motor in accordance with the selected increasing rate.

6. The control device of the electric vehicle according to claim 1, wherein the unit for executing the first control processing is configured to decrease the output torque in accordance with a first decreasing rate, and increase the braking force in accordance with a first increasing rate, and
wherein a magnitude of the first decreasing rate is equal to a magnitude of the first increasing rate.

7. The control device of the electric vehicle according to claim 1, wherein the unit for executing the first control processing is configured to maintain the output torque of the electric motor at zero until the temperature of the switching element decreases to be equal to or less than the second predetermined value.

* * * * *